(12) United States Patent
Andree et al.

(10) Patent No.: US 9,010,848 B2
(45) Date of Patent: Apr. 21, 2015

(54) DIAGONAL STRUT DEVICE, METHOD FOR MANUFACTURING SAME AND MOTOR VEHICLE UNDERFLOOR REINFORCED BY MEANS OF DIAGONAL STRUCTURE DEVICE

(75) Inventors: Denis Andree, Hamburg (DE); Konrad Eipper, Rottenburg (DE); Thomas Rudlaff, Stuttgart (DE); Asmir Salkic, Ulm (DE); Mirko Sretenovic, Stuttgart (DE)

(73) Assignee: Daimler AG, Stuttgart (DE)

( * ) Notice: Subject to any disclaimer, the term of this patent is extended or adjusted under 35 U.S.C. 154(b) by 57 days.

(21) Appl. No.: 13/990,118

(22) PCT Filed: Oct. 13, 2011

(86) PCT No.: PCT/EP2011/005149
§ 371 (c)(1),
(2), (4) Date: May 29, 2013

(87) PCT Pub. No.: WO2012/072160
PCT Pub. Date: Jun. 7, 2012

(65) Prior Publication Data
US 2013/0249249 A1    Sep. 26, 2013

(30) Foreign Application Priority Data

Dec. 3, 2010 (DE) .......................... 10 2010 053 346

(51) Int. Cl.
*B62D 21/06* (2006.01)
*B62D 25/08* (2006.01)
(Continued)

(52) U.S. Cl.
CPC .............. *B62D 21/06* (2013.01); *B62D 25/087* (2013.01); *B62D 29/001* (2013.01); *B22D 17/00* (2013.01); *B62D 29/041* (2013.01); *B62D 25/20* (2013.01); *B62D 29/004* (2013.01); *B22D 19/04* (2013.01)

(58) Field of Classification Search
CPC ....................................................... B62D 21/06
USPC ............ 280/793, 794; 296/204, 205, 901.01; 29/458, 527.2, 527.3, 527.5, 897.2, 29/DIG. 1, DIG. 5, DIG. 8, DIG. 10, 29/DIG. 27, DIG. 45
See application file for complete search history.

(56) References Cited

U.S. PATENT DOCUMENTS 1,186,013 A * 6/1916 Loring .......................... 180/291
1,483,650 A * 2/1924 Corbin, Jr. ................. 296/181.4
(Continued)

FOREIGN PATENT DOCUMENTS

CH        240088 A  * 11/1945 ........... B23K 11/002
DE        532831 C  *  9/1931 ............. B62D 21/06
(Continued)

*Primary Examiner* — Dennis H Pedder
*Assistant Examiner* — Paul Chenevert
(74) *Attorney, Agent, or Firm* — Patent Central LLC; Stephan A. Pendorf

(57) ABSTRACT

A diagonal strut device (1) for reinforcing arrangement on an undercarriage of a motor vehicle. The diagonal strut device (1) has a plurality of struts (2) made from a fibet-reinforced plastic composite material, which extend away from a central joint element (3). Each strut (2) can be connected to the undercarriage via it's end facing away from the central joint element (3). For this, a connecting joint element (4) is arranged on the end of each strut (2) facing away from the central joint element (3). The central joint element (3) and the connecting joint elements (4) are formed from a light metal material. The central joint element (3) and the connecting joint elements (4) are then connected to the struts (2) by an at least firmly bonded cast joint. Further, a method for the production of a diagonal strut device (1), as well as a motor vehicle undercarriage, which uses the diagonal strut device (1) for reinforcement.

19 Claims, 1 Drawing Sheet

(51) Int. Cl.
   *B62D 29/00* (2006.01)
   *B22D 17/00* (2006.01)
   *B62D 29/04* (2006.01)
   *B62D 25/20* (2006.01)
   *B22D 19/04* (2006.01)

(56) References Cited

U.S. PATENT DOCUMENTS

| | | | | |
|---|---|---|---|---|
| 1,577,060 A * | 3/1926 | Day | | 280/794 |
| 1,591,215 A * | 7/1926 | Jacobs | | 280/794 |
| 1,841,510 A * | 1/1932 | Ranst | | 280/794 |
| 1,917,894 A * | 7/1933 | MacPherson | | 180/292 |
| 2,080,748 A * | 5/1937 | Slack | | 280/793 |
| 2,121,007 A * | 6/1938 | Best | | 280/800 |
| 2,141,635 A * | 12/1938 | Einar | | 280/794 |
| 2,163,694 A * | 6/1939 | Matthews et al. | | 280/794 |
| 2,173,515 A * | 9/1939 | Eklund | | 280/794 |
| 2,173,516 A * | 9/1939 | Eklund | | 280/794 |
| 2,174,915 A * | 10/1939 | Dietrich | | 280/794 |
| 2,177,991 A * | 10/1939 | Maddock | | 280/794 |
| 2,229,371 A * | 1/1941 | Chayne | | 280/783 |
| 2,257,835 A * | 10/1941 | Best | | 280/794 |
| 2,314,603 A * | 3/1943 | Sorensen et al. | | 280/794 |
| D149,830 S * | 6/1948 | Nelson | | D12/159 |
| 2,476,664 A * | 7/1949 | Humig | | 280/124.111 |
| 2,676,030 A * | 4/1954 | Sherman | | 280/797 |
| 2,715,041 A * | 8/1955 | Fierbaugh et al. | | 296/35.1 |
| 2,739,822 A * | 3/1956 | Schilberg | | 280/794 |
| 2,747,887 A * | 5/1956 | Schilberg | | 280/794 |
| 2,835,506 A * | 5/1958 | Schilberg | | 280/794 |
| 4,048,806 A * | 9/1977 | Stuckmann et al. | | 405/145 |
| 4,941,680 A * | 7/1990 | Baiker | | 280/793 |
| 5,507,522 A * | 4/1996 | Ritchie | | 280/800 |
| 6,126,199 A * | 10/2000 | Valin et al. | | 280/781 |
| 6,339,869 B1 * | 1/2002 | Peterson | | 29/527.5 |
| 6,468,613 B1 | 10/2002 | Kitano et al. | | |
| 6,869,136 B2 * | 3/2005 | Igarashi et al. | | 296/204 |
| 7,055,837 B2 * | 6/2006 | Noble | | 280/124.155 |
| 7,090,290 B2 * | 8/2006 | Neumeier et al. | | 296/204 |
| 7,891,728 B2 * | 2/2011 | Westing et al. | | 296/204 |
| 8,534,748 B1 * | 9/2013 | Aghssa et al. | | 296/187.08 |
| 2004/0100085 A1 | 5/2004 | Fowler et al. | | |
| 2004/0108754 A1 * | 6/2004 | Igarashi et al. | | 296/204 |
| 2005/0248113 A1 * | 11/2005 | Kiel et al. | | 280/124.109 |
| 2007/0107964 A1 * | 5/2007 | Bunsmann et al. | | 180/165 |
| 2007/0267895 A1 * | 11/2007 | Stock-Hansen-Peiersen et al. | | 296/193.01 |
| 2008/0231085 A1 | 9/2008 | Westing et al. | | |
| 2008/0265626 A1 | 10/2008 | Dorr et al. | | |
| 2010/0007206 A1 * | 1/2010 | Wodrich | | 305/198 |
| 2010/0038471 A1 * | 2/2010 | Olsen et al. | | 244/54 |
| 2012/0306238 A1 * | 12/2012 | Midoun et al. | | 296/204 |
| 2013/0300158 A1 * | 11/2013 | Andree et al. | | 296/204 |
| 2014/0300126 A1 * | 10/2014 | Ehrlich et al. | | 296/29 |

FOREIGN PATENT DOCUMENTS

| | | | | |
|---|---|---|---|---|
| DE | 2355551 A1 * | 5/1975 | | B62D 21/06 |
| DE | 3942794 A1 * | 7/1991 | | B62D 21/06 |
| DE | 102004018977 A1 | 11/2005 | | |
| DE | 102006047511 A1 | 4/2007 | | |
| DE | 69836259 T2 | 6/2007 | | |
| DE | 102010020793 A1 | 2/2011 | | |
| EP | 0900716 A1 * | 3/1999 | | B62D 29/00 |
| FR | 2798354 A1 * | 3/2001 | | B62D 21/06 |
| FR | 2915450 A1 | 10/2008 | | |

* cited by examiner

DIAGONAL STRUT DEVICE, METHOD FOR MANUFACTURING SAME AND MOTOR VEHICLE UNDERFLOOR REINFORCED BY MEANS OF DIAGONAL STRUCTURE DEVICE

BACKGROUND OF THE INVENTION

1. Field of the Invention

The invention relates to a diagonal strut device for reinforcing arrangement on an undercarriage of a motor vehicle. Furthermore, the invention relates to a method for the production of the diagonal strut device wherein a plurality of struts made from a fibre-reinforced plastic composite material are arranged close to one another and connected, with a respective first end section, as well as a motor vehicle undercarriage according to the preamble of claim 13, in which the diagonal strut device is used.

2. Description of the Related Art

Diagonal struts for arrangement on the undercarriage of a motor vehicle are known to increase torsional rigidity. This is particularly important in convertibles with integral bodies, due to the lack of a fixed roof structure. Tensile and compressive forces are introduced from external edge regions of the body to a region located further inside a vertical motor vehicle median longitudinal plane via the diagonal struts, for example above the spare tyre recess. These tensile and compressive forces occur due to undesired vibrations and deformations of the body, which may arise during the driving operation, whereby driving safety and comfort are disadvantageously affected and the motor vehicle structure is loaded.

In this way, DE 10 2004 018 977 A1 describes a motor vehicle with increased possibilities for the strut course and its connection to the body. To that end, the vehicle has four reinforcing struts, which are fastened to a crossbeam, which is arranged freely beneath the undercarriage in the vertical median longitudinal plane of the vehicle and at a distance from this. The struts extend outwards from this crossbeam and are connected to the body in its undercarriage region at its ends that are facing away from the crossbeam. The struts can be formed from metal or a fibre-reinforced polymer.

In the course of the lightweight construction of motor vehicles, more and more hybrid components are being used, which connect different materials, for example light metal elements with fibre-reinforced polymers. DE 698 36 259 T2 discloses a light metal/CFK component, wherein a carbon fibre plastic material is affixed to a light metal material by means of an adhesive layer containing an epoxy adhesive and being provided in a thickness of 10 to 500 μm. To prevent contact corrosion between the carbon fibre plastic material and the light metal material, the adhesive layer is to have a specific volume resistance of at least $1 \cdot 10^{13}$ Ω·cm and an adhesive strength at room temperature of at least 15 MPa.

A weight-optimised crossmember made from a light metal material or a non-ferrous material, for example from a fibre-reinforced polymer, is known from DE 102006 047 511 A1.

Based on this prior art, the object arises to provide a diagonal strut device that increases the torsional rigidity of a motor vehicle for arrangement on a motor vehicle undercarriage, which allows for lightweight construction concepts and thus combines high tensile and compressive strength with low weight, and can be produced simply in very few steps.

BRIEF SUMMARY OF THE INVENTION

This object is solved by a diagonal strut device, by a method, and a motor vehicle undercarriage as described below.

Developments of the device and the method are embodied in the respective sub-claims.

Furthermore, an improved motor vehicle undercarriage is disclosed by the use of the diagonal strut device on the undercarriage of a motor vehicle.

A first embodiment of a diagonal strut device according to the invention, which is suitable for reinforcing arrangement on an undercarriage of a motor vehicle, deals with the fact that the diagonal strut device comprises several struts that consist of a fibre-reinforced plastic composite material and that extend away from a central joint element. The diagonal strut device can be connected to the undercarriage via the ends of the struts that face away from the central joint element. To that end, each strut has a connecting joint element according to the invention at its end facing away from the central joint element, which, just like the central joint element, is made from a light metal material. Thus, the connecting joint elements according to the invention, together with the fibre-reinforced plastic struts, advantageously lead to a clearly lower weight of the reinforcing construction than the diagonal struts made from steel material that are typically used.

Due to the framework-like construction of the diagonal strut device made from several struts, which are connected at one end by a joint and can be fixed to the body at the other end, only tensile and compressive forces arise in the individual fibre-reinforced plastic struts, whereby the high torsional rigidity of the diagonal strut device comes about. The tensile and compressive forces, which are present on a motor vehicle undercarriage with the diagonal strut device according to the invention, are introduced into the body via these. Advantageously, the central and connecting joint elements are designed as cast joints and are thus firmly bonded with the struts, while the central and connecting joint elements are simply cast onto the struts.

It is, however, also conceivable for the struts, at their end sections, to not only be cast onto the central and connecting joint elements, but also integrally cast, or for the struts to have a hollow profile at least at the end sections, into which the cast central joint element and/or the connecting joint element extends. A combination of the aforementioned connection types is also considered for the plurality of cast joints between the struts and joint elements.

In addition, the struts of the diagonal strut device can have openings at their end sections at which the joints are cast or integrally cast, which are permeated by the cast material of the cast joint and form a positive fit. Alternatively or additionally, the end sections of the struts can have structures added to them that are enclosed positively by the cast material of the cast joint.

In a further embodiment of the diagonal strut device according to the invention, provision is made for the struts to have a thermally insulating coating added to them at least at their end sections, at which the cast joint is provided. This thermally insulating coating prevents the fibre-reinforced material of the struts from being damaged during the casting of the joint elements. Alternatively or additionally to the thermally insulating coating, a metallic coating of the end sections can be expedient, such that the metallic coating provides the firmly bonded connection with the cast joint elements.

It is also conceivable to equip the struts with an adhesion-improving coating at least at their end sections, which for example has a structured surface and thus effects a mechanical clamping of the cast joint element to the end sections.

A further embodiment of the diagonal strut device according to the invention deals with the fact that the diagonal strut device has connecting aids, by means of which they can be connected to the motor vehicle undercarriage more simply, which, if necessary, can have corresponding connecting agents. The connecting aids are provided on the connecting joint elements and here they can be bore holes, inserts, screw threads, adherends, clinch elements and/or weld contact areas.

Furthermore, the firmly bonded cast joint of the struts to the central joint element and the connecting joint element can additionally be reinforced by a force-fit connection that can be achieved by using rivets or screws, which ensures the connection of a respective element to the struts.

The struts of the diagonal strut device can be fibre-reinforced pultrusion profiles, which in particular can have a fibre proportion of up to 70% with respect to the total weight of the profiles, and thus can have a high level of tensile and compressive strength.

It is preferred for the diagonal strut device to be formed from up to four struts. In a particular embodiment, the diagonal strut device is formed from four struts that are arranged in an X-shape on the central joint element. For such a diagonal strut device, but also for diagonal strut devices that are designed differently with respect to the number or arrangement of the struts, the struts can be arranged slanted towards one another at the central joint element, such that the central joint element is separated from the planes that fix the fastening elements located at the other ends of the struts. This separation also enables the connection of the diagonal strut device to an undercarriage with complicated body ratios.

The lightweight material for the formation of the joint elements is a light metal or a light metal alloy such as aluminium or magnesium or alloys thereof, for example with silicon.

A production method according to the invention for the diagonal strut device comprises the following steps:
- providing the fibre-reinforced plastic struts and inserting them into a moulding tool, wherein the fibre-reinforced plastic struts are located close to one another with a first end section in a region provided for the formation of the central joint element in one cavity and, with their second end sections, are located separated from one another in a respective region in a cavity which is provided for the formation of the connecting joint element,
- closing the tool and die-casting a molten light metal material into the cavities, then forming the central joint element and connecting joint element and simultaneously firmly bonding the central joint element and the connecting joint element to the struts, and
- removing the diagonal strut device.

Advantageously, the production method only requires inserting the fibre-reinforced plastic struts into the tool and moulding them with light cast metal, and can thus be embodied simply and efficiently. Further steps for the assembly of the central joint elements and connecting joint elements with the struts are dispensed with.

During the die-casting, the heat of the light-metal cast is discharged by means of a cooling system for the tool, so as to avoid damaging the fibre-reinforced plastic struts.

Alternatively or additionally to this, a thermally insulating and sealed layer can be applied to a surface of a section of the fibre-reinforced plastic struts, which are to be moulded by a liquid light metal or a liquid light metal alloy. The thermally insulating layer is, advantageously, thermally resistant, stable, sealed and/or gas-tight. Preferably, the thermally insulating layer has at least one metallic or ceramic or polymerous material or a combination of the aforementioned materials. The thermally insulating layer has a preferred thickness of 10 µm to 1000 µm. The thermally insulating layer furthermore preferably has a composition that supports the adhesion of the light metal material onto the fibre-reinforced plastic struts. The application of the thermally insulating layer can, advantageously, take place by means of winding, immersion, sputtering, powder-coating, spin coating, plasma injection or in another suitable manner.

The diagonal strut device according to the invention is suitable for reinforcing arrangement on an undercarriage of a motor vehicle, wherein the central joint element of the diagonal strut device is arranged beneath the undercarriage in a vertical median longitudinal plane of the motor vehicle and the diagonal strut device is riveted, screwed, adhered, clinched and/or welded to the undercarriage during assembly or shell construction by means of the connecting joint element.

BRIEF DESCRIPTION OF THE SEVERAL VIEWS OF THE DRAWINGS

These and other advantages are demonstrated by the description below with reference to the accompanying figures. The reference to the figures in the description serves to support the description and to facilitate understanding of the subject matter. The figures are only a schematic depiction of an embodiment of the invention.

Here are shown.

DETAILED DESCRIPTION OF THE INVENTION

Figure 1:
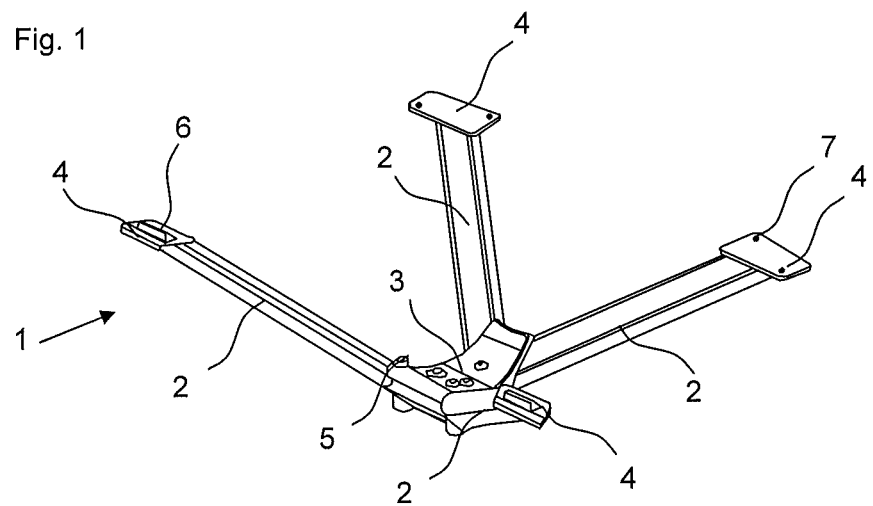
FIG. 1 A perspective top view of an embodiment according to the invention of the diagonal strut device, FIG. 2 A perspective view from below onto an embodiment according to the invention of the diagonal strut device.
Figure 2:
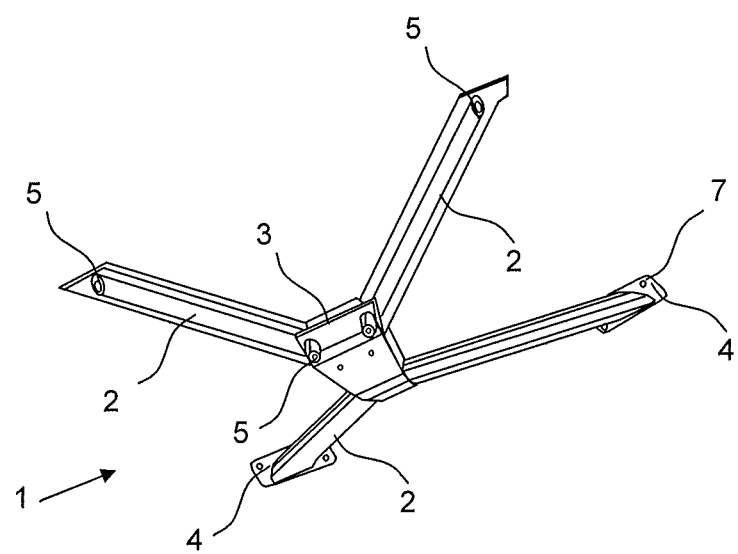

The diagonal strut device according to the invention relates to a so-called framework construction depicted exemplarily in the figures.

The diagonal strut device 1 consists of four pultruded fibre-reinforced plastic struts 2, which are connected to one another by a central light cast metal joint 3. A different number of struts is of course possible—for example six struts. The connecting joint elements 4 provided for connection to a motor vehicle undercarriage also consist of a light metal material. The diagonal strut device 1 set up in this way can be fastened to the undercarriage during assembly or even during shell construction. This is made possible by the cast connecting joint elements 4, which can have corresponding connecting aids for this purpose.

By using a light metal material to create the joints 3, 4, the weight advantage of the fibre-reinforced plastic struts 2 can be maintained. Light metal materials are light metals and alloys having a thickness of less than 5 g/cm³. Above all, there is a technical application for aluminium, magnesium, titanium and, on a small scale, beryllium and lithium. For both aluminium and magnesium alloys, components can be produced in die-casting as a near net shape without cost-intensive post-processing. Machined post-processing is possible, The diagonal strut device 1 shown in the figures can be arranged for reinforcing arrangement on an undercarriage of a motor vehicle, wherein the central joint element 3 of the diagonal strut device 1 is arranged beneath the undercarriage in a vertical median longitudinal plane of the motor vehicle and the diagonal strut device 1 is riveted, screwed, adhered, clinched and/or welded to the undercarriage during assembly or shell construction by means of the connecting joint element 4.

The diagonal strut device 1 in the figures has four struts 2 made from a fibre-reinforced plastic composite material, wherein these are fibre-reinforced plastic pultrusion profiles 2, which can have a fibre proportion of up to 70% and which extend away from the central joint element 3 in an X-shape in a slanted manner, such that the ends of the struts 2 that are facing away from the central joint element 3, at which the connecting joint elements 4 are present, fix a plane that is separated from the central joint element 3.

Due to the fact that the joint elements 3, 4 are cast into the end sections of the struts 2, a firmly-bonded connection is provided. Depending on the set-up of the joint elements 3, 4, with respect to both the strut arrangement and to the connection to the body provided, this is sufficient if the joint elements 3, 4 are only cast into the end sections of the struts 2; the end sections of the struts 2 can, however, only be moulded into the central joint element 3 and/or the connecting joint element 4, so as to strengthen the connection. However, a section of the respective cast joint 3, 4 can also extend into the interior of a strut end section designed as a hollow profile, such that the central joint element 3 and/or the connecting joint element 4 are partially moulded into the strut end sections.

The cast joint can be reinforced by openings and/or structures, which can have the struts 2 at their end sections and which can be enclosed and/or enclosed positively by the cast material of the cast joint.

Furthermore, to protect the fibre-reinforced plastic struts 2 from heat introduction of the light cast metal during the casting process, since the melting point ranges of the light cast metal are between 400 and 660° C., it is conceivable for the struts 2 to have a thermally insulating coating and/or a metallic coating added to them at their end sections on which the cast joint is provided.

A coating of the end sections of the struts 2 can also contribute towards adhesion improvement, in that the coating provides a structured surface that enables a clamping of the joint element material that is cast into the struts 2.

The connecting joint elements 4 have, if necessary, connecting joint elements, by means of which the diagonal strut device 1 can easily be connected to an undercarriage, which in this cause should have corresponding connection points to the connecting joint elements 4. Bore holes 7 or inserts, with or without screw threads in the connecting joint elements 4, are considered for being connecting aids, which allow connection with rivets or screws. It is, however, also conceivable for the connecting joint elements 4 to provided surfaces that are provided for adhesion or welding. Another connection possibility for the connecting joint elements 4 is in the design of clinch elements 6, which have a shape similar to that of a push-button and which assume a positive and force-fit connection to a corresponding counter element (on the undercarriage).

The various connecting joint elements 4 of a diagonal strut device 1 can here have different connecting aids.

The central joint element 3 or the connecting joint elements 4 or both can additionally be connected to the struts 2 by a force-fit connection, by means of rivets or screws 5, for example.

To produce the diagonal strut device 1, the required fibre-reinforced plastic struts 2 are preferably produced by pultrusion and inserted into a die-casting tool. For the joint elements that are to be formed, the die-casting tool has cavities and recesses for the struts that are to be inserted. A central cavity serves to form the central joint element 3. The inserted struts 2 protrude, at one end, towards or into the central cavity, such that the cast joint can be produced here. At the other ends of the strut recesses, the cavities provided for the formation of the connecting joint elements 4 are located in the die-casting tool, towards or into which the inserted struts 2 extend. The tool is closed off by the inserted struts 2 and a die-casting process is begun. The molten light metal material reaches the cavities and forms the central joint element 3 and the connecting joint elements 4 here, wherein, at the same time, the firmly bonded connection with the struts 2 occurs. After the cast joint elements 3, 4 have solidified, the diagonal strut device 1 can be removed.

To protect the fibre-reinforced plastic struts from heat damage, the heat inserted with the cast is discharged during the die-casting process by means of a cooling system for the tool.

The invention claimed is:

1. A diagonal strut device (1) for reinforcing arrangement on an undercarriage of a motor vehicle, wherein the diagonal strut device (1) comprises:
   a central joint element (3),
   a plurality of struts (2) made from a fibre-reinforced plastic composite material, which extend away from the central joint element (3), wherein each strut (2) has an end facing the central joint element and an end facing away from the central joint element, and can be connected to the undercarriage via the end facing away from the central joint element (3), and a connecting joint element (4) arranged on the end of each strut (2) facing away from the central joint element (3) to provide the connection to the undercarriage,
   wherein the central joint element (3) and the connecting joint elements (4) are formed from a light metal material and are connected to the struts (2) by an at least firmly-bonded cast joint.

2. The diagonal strut device (1) according to claim 1, wherein at least one of the central joint element (3) and the connecting joint elements (4) are cast into the end sections of the struts (2).

3. The diagonal strut device (1) according to claim 1, wherein the end sections of the struts (2) are moulded into the central joint element (3) or the connecting joint elements (4).

4. The diagonal strut device (1) according to claim 1, the struts (2) have a hollow profile at least at the end sections, into which at least one of the central joint element (3) and the connecting joint element (4) is moulded.

5. The diagonal strut device (1) according to claim 1, wherein the struts (2) have openings or structures or both at their end sections, which are permeated or enclosed positively by the cast material of the cast joint.

6. The diagonal strut device (1) according to claim 1, wherein the struts (2) have at least one of a thermally insulating coating and a metallic coating added to them at least at their end sections at which the cast joint is provided.

7. The diagonal strut device (1) according to claim 1, wherein the struts (2) have an adhesion-improving coating added to them at least at their end sections at which the cast joint is provided.

8. The diagonal strut device (1) according to claim 1, wherein the struts (2) have an adhesion-improving coating added to them at least at their end sections at which the cast joint is provided, which provides a structured surface.

9. The diagonal strut device (1) according to claim 1, wherein the diagonal strut device (1) comprises connecting aids, by means of which the diagonal strut device (1) can be connected to the undercarriage, wherein the connecting aids are provided on the connecting joint elements (4) and comprise at least one of bore-holes, inserts, screw threads, adherends, clinch elements and weld contact areas.

10. The diagonal strut device (1) according to claim 1, wherein the central joint element (3) and or the connecting joint elements (4) are additionally connected to the struts (2) by a force-fit connection.

11. The diagonal strut device (1) according to claim 1, wherein the central joint element (3) and or the connecting joint elements (4) are additionally connected to the struts (2) by riveting or screwing (5).

12. The diagonal strut device (1) according to claim 1, wherein the struts (2) are fibre-reinforced plastic pultrusion profiles (2).

13. The diagonal strut device (1) according to claim 1, wherein the struts (2) are fibre-reinforced plastic pultrusion profiles (2) having a fibre proportion of up to 70% with respect to the total weight of the fibre-reinforced plastic pultrusion profile (2).

14. The diagonal strut device (1) according to claim 1, wherein the diagonal strut device (1) comprises up to four struts (2), which are arranged in an X-shape on the central joint element (3), such that the central joint element (3) is separated from a plane that fixes the fastening element (4).

15. The diagonal strut device (1) according to claim 1, wherein the diagonal strut device (1) comprises up to four struts (2), which are arranged slanted towards one another at the central joint element (3), such that the central joint element (3) is separated from a plane that fixes the fastening element (4).

16. The diagonal strut device (1) according claim 1, wherein the light metal material is a light metal or a light metal alloy.

17. A method for the production of a diagonal strut device (1) according to claim 1, comprising the following steps:
   providing the plurality of struts (2) made from a fibre-reinforced plastic composite material and inserting them into a die-casting tool, wherein the struts (2) are located close to one another with a first end section in a region provided for the formation of the central joint element (3) in one cavity and, with their second end sections, are located separated from one another in a respective region in a cavity, which is provided for the formation of the connecting joint element,
   closing the die-casting tool and die-casting a molten light metal material into the cavities, forming the central joint element (3) and connecting joint elements (4) and simultaneously firmly bonding the central joint element (3) and the connecting joint elements (4) to the struts (2), and
   removing the diagonal strut device (1).

18. The method according to claim 17, comprising the following step:
   during the die-casting, removing heat from the die-casting tool by means of a cooling system for the die-casting tool.

19. A motor vehicle undercarriage, which is reinforced by a diagonal strut device arranged on the motor vehicle undercarriage, wherein the diagonal strut device comprises:
   a central joint element (3),
   a plurality of struts (2) made from a fibre-reinforced plastic composite material, which extend away from a central joint element (3), wherein each strut (2) has an end facing the central joint element and an end facing away from the central joint element, and is connected to the undercarriage via the ends facing away from the central joint element (3), and
   a connecting joint element (4) arranged on the end of each strut (2) facing away from the central joint element (3) connection with the undercarriage unreleasably, wherein the central joint element (3) and the connecting joint elements (4) are formed from a light metal material and are connected to the struts (2) by an at least firmly-bonded cast joint.

* * * * *